(12) United States Patent
Griepentrog et al.

(10) Patent No.: US 8,250,993 B2
(45) Date of Patent: Aug. 28, 2012

(54) LAPTOP COMPUTER STORAGE ASSEMBLY FOR A WORK SURFACE

(75) Inventors: Dennis G. Griepentrog, DePere, WI (US); Timothy G. Hornberger, Green Bay, WI (US)

(73) Assignee: Krueger International, Inc., Green Bay, WI (US)

( * ) Notice: Subject to any disclaimer, the term of this patent is extended or adjusted under 35 U.S.C. 154(b) by 304 days.

(21) Appl. No.: 12/642,204

(22) Filed: Dec. 18, 2009

(65) Prior Publication Data

US 2011/0146541 A1 Jun. 23, 2011

(51) Int. Cl.
*A47B 81/00* (2006.01)

(52) U.S. Cl. ............ 108/25; 312/223.3; 108/50.02

(58) Field of Classification Search .......... 312/223.3, 312/196, 208.1, 21–30, 312, 325, 319.1–319.8, 312/271–276; 108/25, 26, 50.01, 50.02
See application file for complete search history.

(56) References Cited

U.S. PATENT DOCUMENTS

| | | | |
|---|---|---|---|
| 993,588 A | | 5/1911 | Donning |
| 1,417,814 A | * | 5/1922 | Fairweather ............. 190/16 |
| 1,811,421 A | * | 6/1931 | Brainard ............ 312/272.5 |
| 2,033,642 A | * | 3/1936 | Moore ............... 312/23 |
| 2,244,145 A | * | 6/1941 | Erickson ............... 99/337 |
| 4,426,122 A | | 1/1984 | Lainez et al. |
| 4,576,424 A | | 3/1986 | Nelson |
| 4,695,104 A | | 9/1987 | Lederman |
| 4,796,244 A | * | 1/1989 | Tsuruta et al. ............ 369/30.87 |
| 4,828,342 A | | 5/1989 | Stefan |
| 5,005,669 A | | 4/1991 | Umebara et al. |
| 5,242,217 A | | 9/1993 | Gonnet |
| 5,526,756 A | | 6/1996 | Watson |
| 5,797,666 A | | 8/1998 | Park |
| 5,931,549 A | | 8/1999 | Lindberg |
| 6,012,785 A | | 1/2000 | Kawasaki |
| 6,012,788 A | | 1/2000 | Marschand et al. |
| 6,556,678 B1 | | 4/2003 | Boyce |
| 6,733,094 B1 | | 5/2004 | Chang |
| 6,851,910 B2 | * | 2/2005 | Luffel ............ 414/283 |
| 7,100,516 B2 | | 9/2006 | Riddiford et al. |
| 7,487,729 B2 | | 2/2009 | Riddiford et al. |
| 7,578,243 B2 | | 8/2009 | Gevaert |
| 2002/0101139 A1 | | 8/2002 | Lee |
| 2004/0000258 A1 | * | 1/2004 | Riddiford et al. ......... 108/50.01 |
| 2006/0061942 A1 | | 3/2006 | Abel et al. |
| 2008/0072803 A1 | | 3/2008 | Korber et al. |

FOREIGN PATENT DOCUMENTS

| | | |
|---|---|---|
| RU | 2094007 | 10/1997 |
| WO | 2006009531 | 1/2006 |

\* cited by examiner

*Primary Examiner* — Darnell Jayne
*Assistant Examiner* — Timothy M Ayres
(74) *Attorney, Agent, or Firm* — Andrus, Sceales, Starke & Sawall, LLP

(57) ABSTRACT

A storage assembly adapted to be secured to a work surface includes an enclosure defining an interior, wherein the enclosure is adapted to be secured around an opening in the work surface. A platform is disposed within the enclosure, and a cover is connected to the enclosure and configured to enclose the interior of the enclosure. The cover is movable between a closed position and an open position, wherein the cover in the closed position forms a top wall for the enclosure, and wherein the cover in the open position exposes the platform. A movement control arrangement is connected between the enclosure, the platform and the cover. The movement control arrangement and the enclosure have cooperating guide slot structure for receiving and guiding the platform, and enabling raising and lowering of the platform within the enclosure in response to movement of the cover between the open and closed positions.

13 Claims, 8 Drawing Sheets

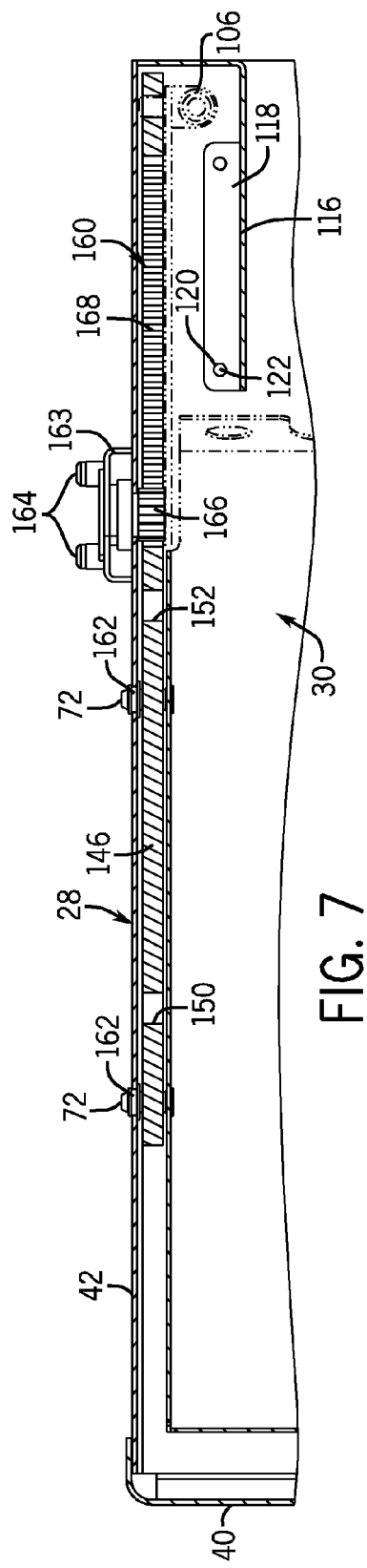
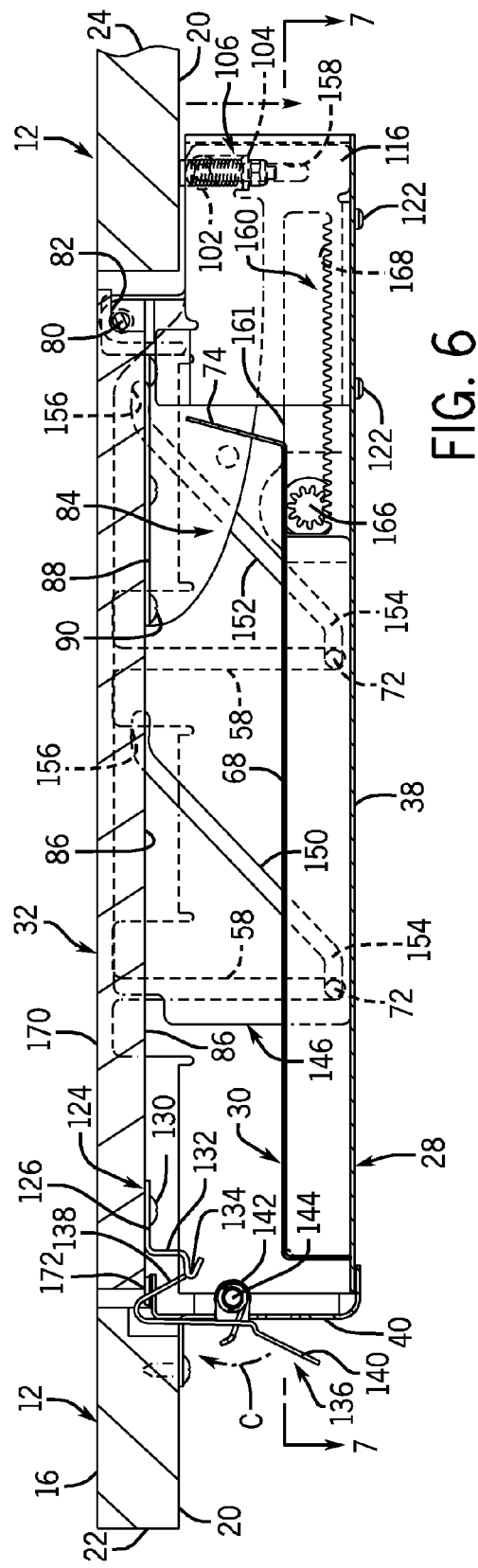

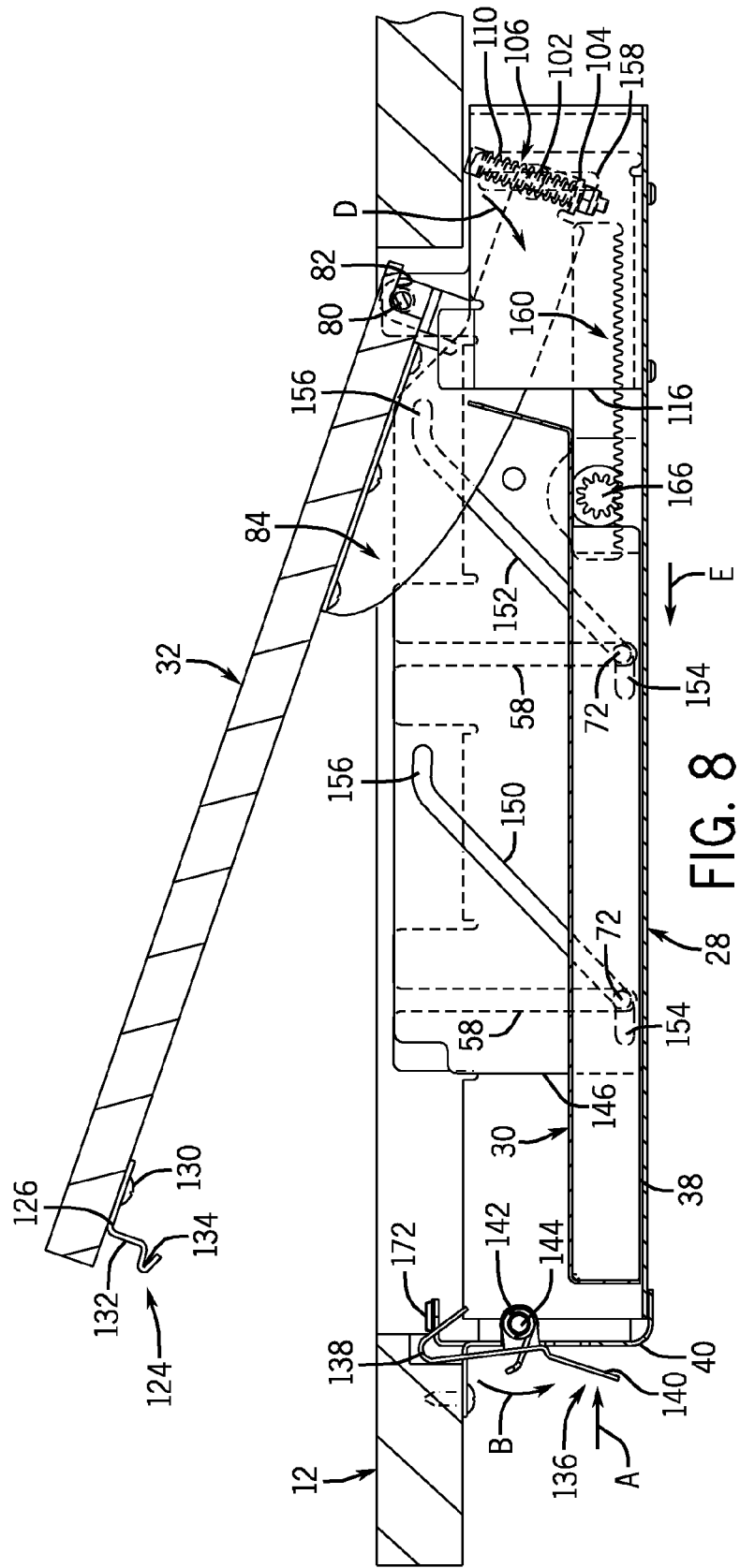

LAPTOP COMPUTER STORAGE ASSEMBLY FOR A WORK SURFACE

FIELD OF THE INVENTION

The present disclosure relates to work surfaces, and more specifically, to a storage assembly for use with a work surface which is capable of selectively enclosing and exposing items, such as a computing device, from within the work surface.

BACKGROUND OF THE INVENTION

Tables, desks and work stations have been modified in their construction in order to more readily accommodate computing devices such as laptop and desk top computers. While advancements in computer technology have resulted in a reduction in the size of computers, such devices still occupy significant space on a desk or table top when being used. Often times, it is necessary to remove a computer from the desk or table top in order to enable an individual to effectively utilize an area of the desk or table top.

To avoid this problem, a number of prior art desks and tables have been developed in which the various portions of a computer can be selectively elevated above or below or beneath the surface of the desk or table. Examples of such desks and tables are illustrated in U.S. Pat. Nos. 5,242,217, 5,797,666, 6,012,788, and 6,733,094, which are incorporated by reference herein. These prior art patents illustrate various desks and tables in which one or more multiple parts of the desk or table can be moved generally vertically relative to the remainder of the working surface in order to selectively expose a compartment containing a component of the computer, e.g., a monitor. When the compartment is exposed, the computer can be utilized in a conventional fashion. Further, when the compartment is in the retracted or stored position, the entire working surface area of the desk or table can be utilized for any desired purpose since the compartment and the computer component contained therein are entirely positioned beneath the surface of the desk or table.

However, each of these tables or desks involves a relatively complex construction in order to accommodate the particular elevating mechanism and/or object retaining structure. Therefore, the cost and time required for the projection of such desk or tables is quite high. Also, due to the significant number of components required, the maintenance and repair for such desks and tables are also significantly higher than the cost associated with conventional desks and tables that are used for supporting computers.

Therefore, it is desirable to provide a structure for use with a desk or table top which is capable of concealing a computer device within the desk or table structure, and which does not require that the desk or table be constructed in a manner significantly different than conventional furniture items of this type. Further, the structure utilized with the desk or table should be entirely self-contained, such that the structure can be incorporated into existing desks or tables in a manner that enables the desk or table to function normally, while also allowing the desk or table to provide a compartment for selectively storing and displaying the computer device.

SUMMARY OF THE INVENTION

According to the present disclosure, a storage assembly is provided for selectively displaying and storing an item or items, such as a laptop or notebook computer, from within a work surface. The storage assembly includes an enclosure formed of a generally rigid material that is securable directly below an opening formed in the work surface, which may be a desk top or table top, among other suitable surfaces. A platform is movable with respect to the enclosure from an elevated position in which the platform is positioned adjacent an upper end of the work surface, to a retracted position in which the platform is positioned below the work surface adjacent a bottom wall of the enclosure. Thus, when a laptop computer or other similar device is positioned on the platform, the storage assembly can be operated to either the lift the computer to an exposed position in which the computer can be utilized by an individual seated at the desk or table, or to lower the computer completely within the enclosure for containment therein.

In order to retain and enclose the computer within the enclosure when the platform is in the retracted position, the storage assembly further includes a cover pivotally secured to and over the enclosure. The cover can be moved between an open position, in which it is positioned away from the enclosure, and a closed position in which it is disposed directly over the enclosure. In the closed position, the cover is positioned flush with the work surface, i.e., the top of the table or desk, such that the cover forms a virtually seamless extension of the work surface enabling an individual to utilize the entire work surface of the table or desk, as desired. Also, the cover includes a hinge bracket assembly connected to a shuttle arrangement which is movably supported on the enclosure. Movement of the cover and hinge bracket assembly moves the shuttle arrangement back and forth in the enclosure which, in turn, causes the platform to move between the elevated and retracted positions along a path defined by cooperating guide slot structure formed in the enclosure and the shuttle arrangement. The storage assembly can additionally include a damping mechanism to control the speed at which the platform is raised and lowered and at which the cover is opened and closed.

Additional aspects, features and advantages of the present invention will be made apparent through the following description taken together with the drawing figures.

BRIEF DESCRIPTION OF THE DRAWINGS

The drawings illustrate the best mode currently contemplated of carrying out the present invention.

In the drawings:

FIG. 6 is a cross sectional view taken along line 6-6 of FIG. 5 showing the storage assembly in the closed position;

FIG. 7 is a cross sectional view taken along line 7-7 of FIG. 6;

FIG. 8 is a cross sectional view similar to FIG. 6 showing the storage assembly in a partially open position.

DETAILED DESCRIPTION OF THE PREFERRED INVENTION

Figure 1:
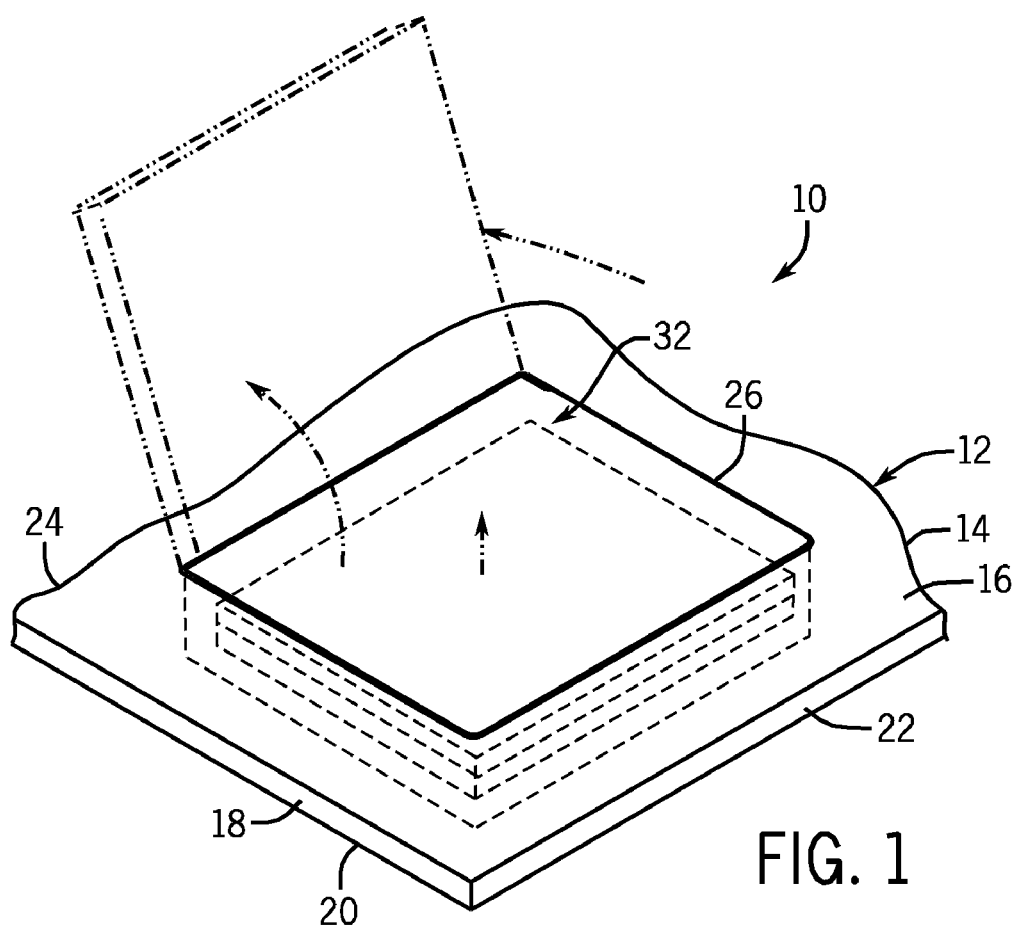
FIG. 1 is a perspective view of a portion of a work surface incorporating a storage assembly of the present invention.

With reference to FIGS. 1-9, a storage assembly 10 constructed according to the present invention is preferably adapted to be secured to a support structure such as a table or desk 12 that includes a base (not shown) that is positionable on a support surface such as a floor (not shown), and a desk top or work surface 14 secured to the base. The work surface 14 can have a desired shape according to user requirements, and may be generally rectangular in shape having an upper surface 16, a pair of side surfaces 18 and a lower surface 20, which together define a front end 22 and a rear end 24. The work surface 14 can be formed from any desired material as long as the material forming the work surface 14 is sufficiently rigid to withstand the environment in which the desk 12 is used. The work surface 14 may be formed of relatively rigid material such as a hard plastic or metal, wood or composite material in a manner as is known. These types of material allow the work surface 14 to be painted, laminated, coated or otherwise modified in appearance to provide a table or desk having a desired appearance. It is also understood that reference number 14 may simply denote a section of a larger desk top or table top within which storage assembly 10 may be secured, and that any number of storage assemblies may be incorporated in such a desk top or table top. The work surface 14 includes an inner opening 26 that is located in any desired position, e.g. toward front end 22. Opening 26 may be generally rectangular in shape. However, it should be understood that opening 26 can also be positioned in any desired location on the work surface 14 and can have any desired shape compatible with storage assembly 10.

Figure 4:
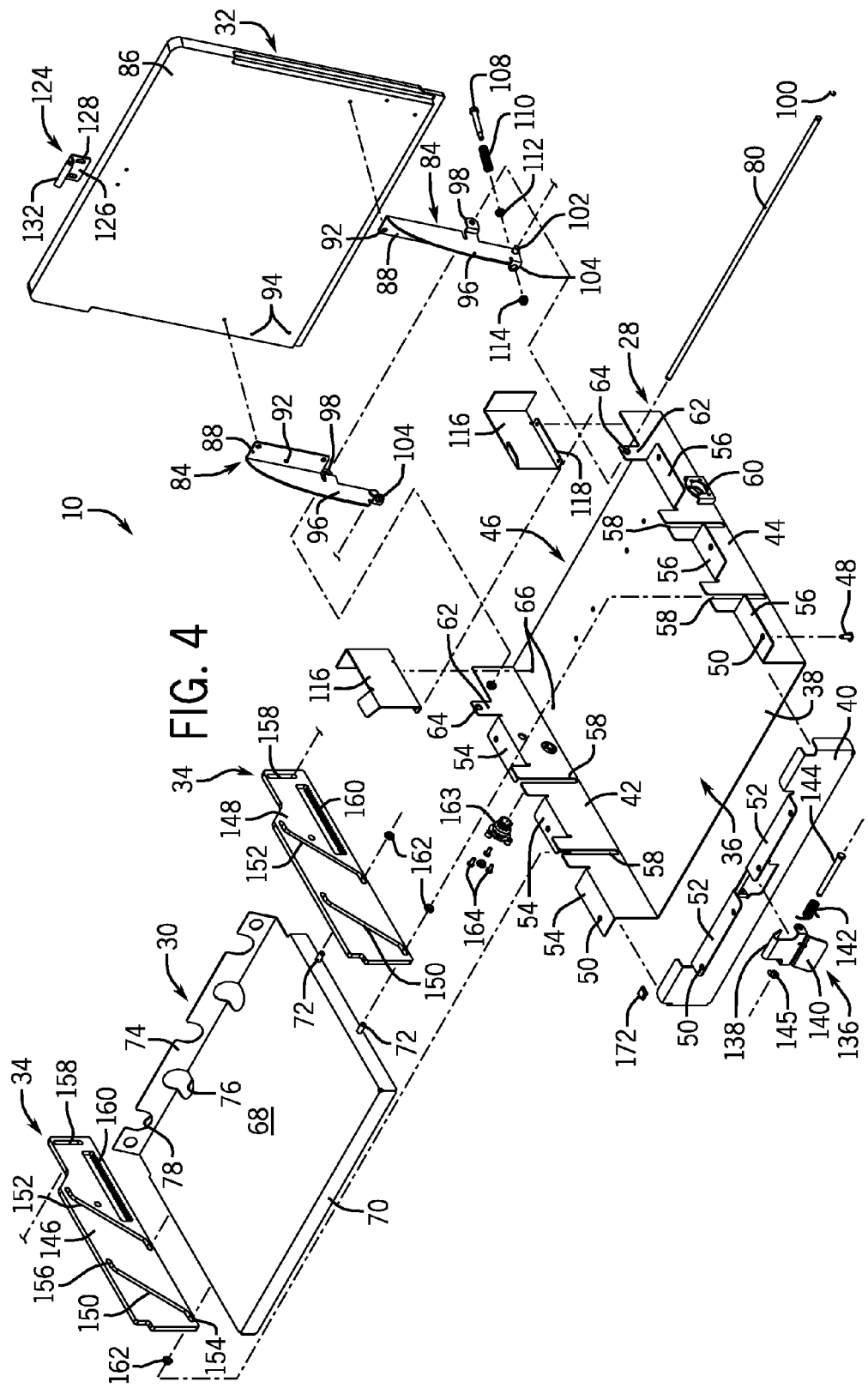
FIG. 4 is an exploded view of the storage assembly.
Figure 5:
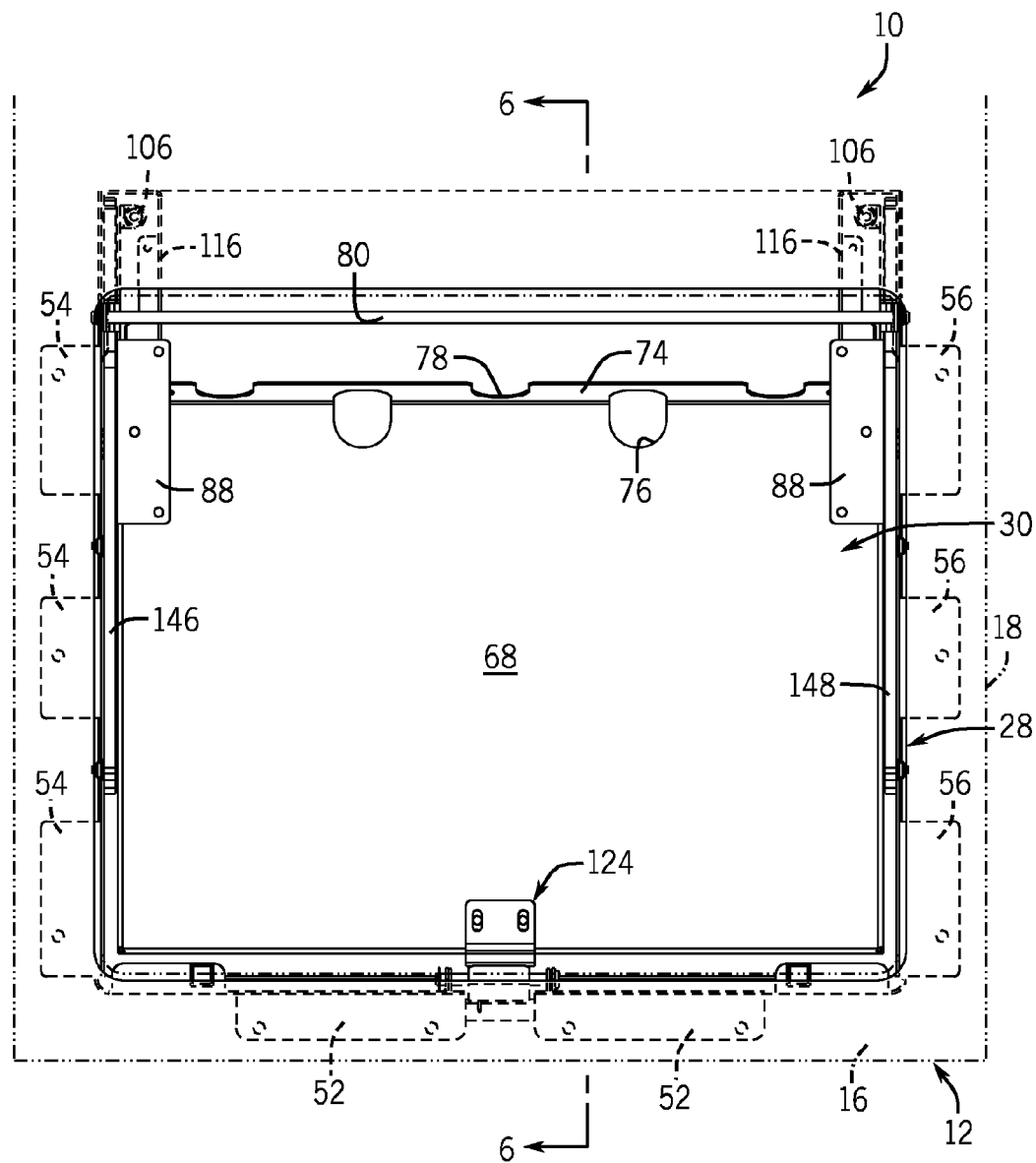
FIG. 5 is a partially broken away plan view of FIG. 2.

As seen best in FIG. 4, the storage assembly 10 is generally comprised of an enclosure 28, a platform 30, a cover 32 and a movement control arrangement 34 for enabling movement of the platform 30 between elevated and retracted positions relative to the enclosure 28 in response to opening and closing of cover 32.

The enclosure 28 is formed of a generally rigid material such as a metal or hard plastic, and has an interior 36, a bottom wall 38, a front wall 40 joined to the bottom wall 38 and a pair of side walls 42, 44 joined to the bottom wall 38 and each extending rearwardly from the front wall 40. The enclosure 28 can be formed in any satisfactory manner such that each of the respective walls 38-44 are connected with one another. Representatively, the bottom wall 38 and the side walls 42 and 44 may be formed together, and the front wall 40 may be formed separately and then assembled to the bottom wall 38 and side walls 42, 44 to form the enclosure 28. In addition, the enclosure 28 defines an open rear end 46 opposite the front wall 40 and between the side walls 42, 44 to reduce the weight of the enclosure 28 and to provide access for cords, wires and cables (not shown) into the interior 36 of the enclosure 28. The open rear end 46 allows any liquids that are inadvertently spilled into the enclosure 28 to easily and quickly flow out of the enclosure 28 without causing significant damage to the components of the assembly 10 or to any equipment contained in the enclosure 28.

The enclosure 28 is secured around the opening 26 of the work surface 14 by a number of fasteners 48 inserted through bores 50 formed within outwardly extending flanges 52, 54, 56 disposed on each enclosure wall 40, 42, 44, respectively, and which are positioned opposite the bottom wall 38. The flanges 52, 54, 56 are positioned against the lower surface 20 of the work surface 14 around a periphery of the opening 26, such that the bores 50 face the lower surface 20. The fasteners 48 inserted through the bores 50 can be screws or other suitable fasteners, and extend into the work surface 14 a sufficient distance to securely hold the enclosure 28 in place below the opening 26. Each of the enclosure side walls 42, 44 is formed with a pair of vertically extending guide slots 58 and a receiver 60. In addition, each of the side walls 42, 44 has an upstanding tab portion 62 located near open rear end 46 and provided with a recess 64 therethrough. The bottom wall 38 is provided with a number of openings 66 located inwardly of the side walls 42, 44 near the open rear end 46.

Figure 9:
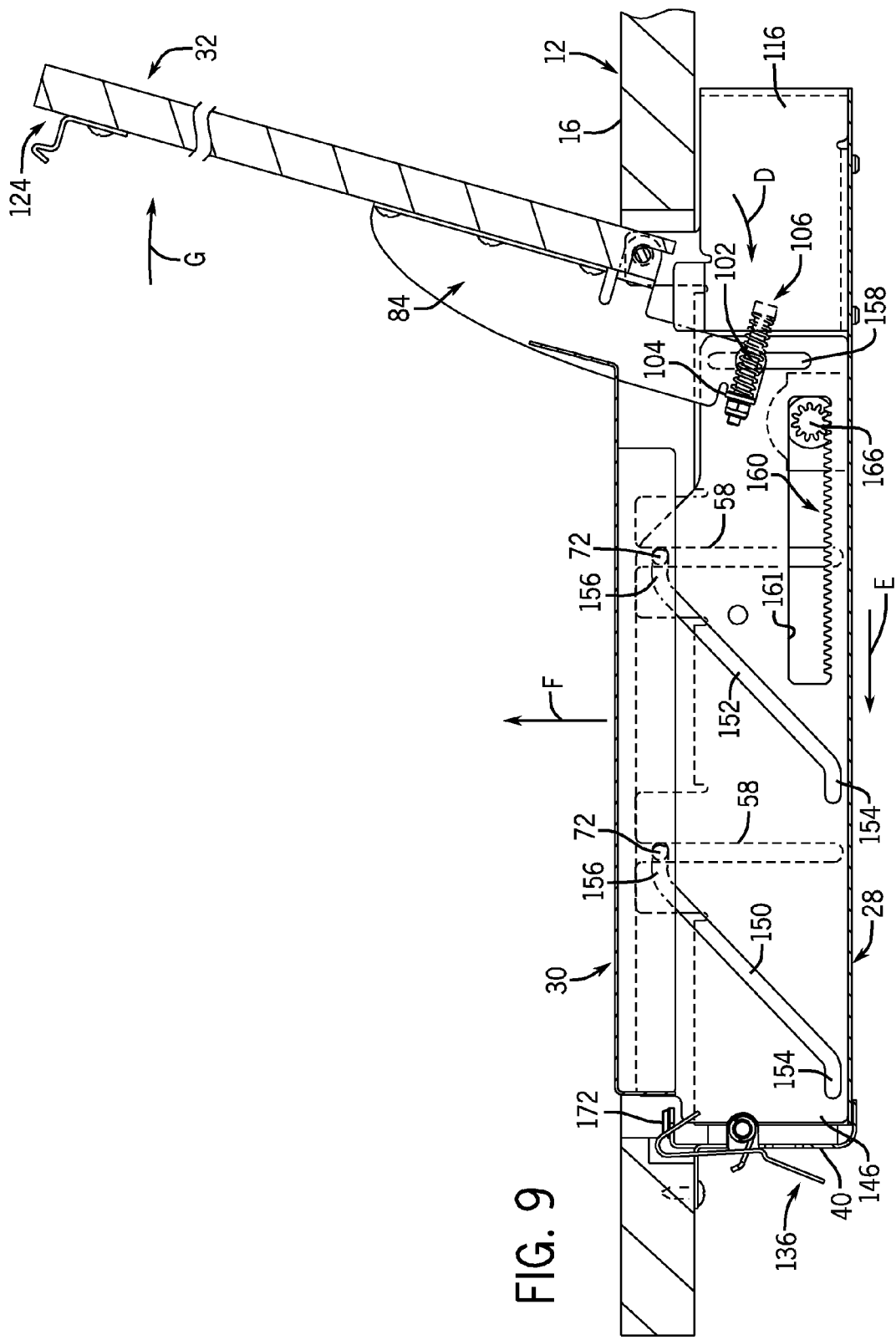
FIG. 9 is a cross sectional view similar to FIG. 8 showing the storage assembly in a fully open position.

The platform 30 is positioned within the interior 36 of the enclosure 28 to be moved between a retracted position (FIG. 6) and an elevated position (FIG. 9). The platform 30 is formed of a generally rigid material such as plastic or metal, and has a shape generally similar to the shape of enclosure 28 when viewed in plan. The platform 30 includes a planar central support surface 68 and a downturned peripheral edge 70 extending around the support surface 68. Side portions of the peripheral edge 70 are each provided with a pair of spaced apart, outwardly extending guide pins 72. The support surface 68 includes an integral back wall 74 formed with one or more recesses 76 and slots 78. The recesses 76 and slots 78 allow power and/or data cables to attach to a computer situated on platform 30 to extend through back wall 74, while maintaining a wall structure to prevent unauthorized access to platform 30 (and to a computer situated thereon) from behind.

Figure 2:
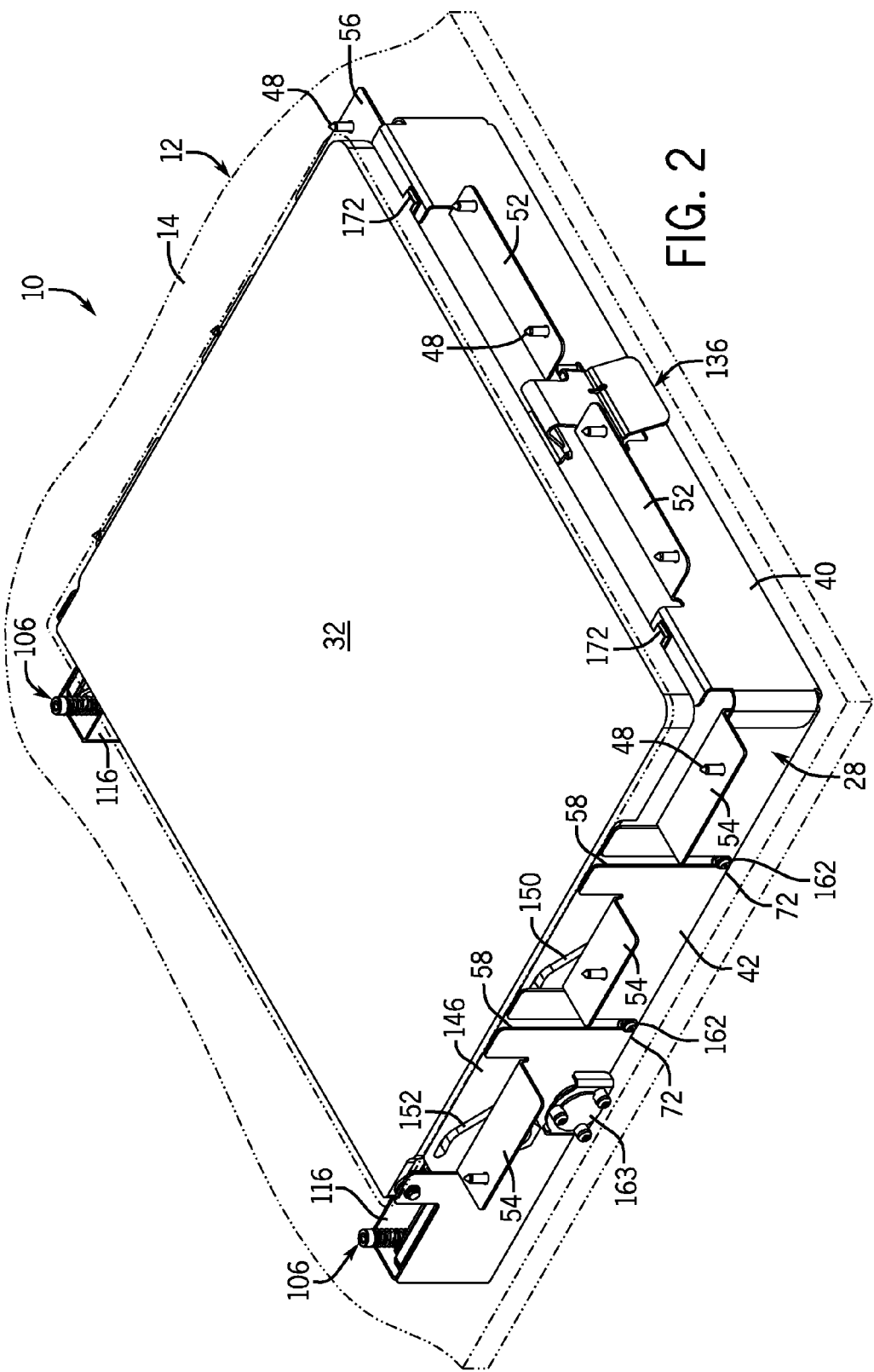
FIG. 2 is a perspective view of the storage assembly of FIG. 1 showing the storage assembly in a closed configuration.

The cover 32 can be moved between an open position (FIG. 3) and a closed position (FIG. 2) to facilitate opening and closing of the storage assembly 10, and to assist in moving the platform 30 between the elevated and the retracted positions. The cover 32 is pivotally attached to the enclosure 28 and can be formed of any suitable rigid material and is preferably formed of a material similar or identical to the material used to form work surface 14 such that the outward appearance of cover 32 matches the appearance of a generally continuous upper surface 16 for the work surface 14 when the cover 32 is in the closed position. In the closed position, the cover 32 forms a top wall for the enclosure 28. Although the cover 32 is shown in FIG. 2 as extending at a 90° angle in the open position, the cover 32 can rotate past a horizontal position to approximately 105°, as illustrated in FIG. 1. The rotation of the cover 32 past a vertical position allows for better access to equipment positioned on the platform 30.

In a particularly preferred embodiment, the cover 32 is pivotally secured to the enclosure 28 by a rod 80 received in the recesses 64 formed in the upstanding tab portions 62 integrally formed on the enclosure side walls 42, 44. Between the tab portions 62, the rod 80 is positioned within a pair of notches 82 disposed adjacent a lower end of the cover 32, which notches 82 rotate with respect to the rod 80.

Figure 3:
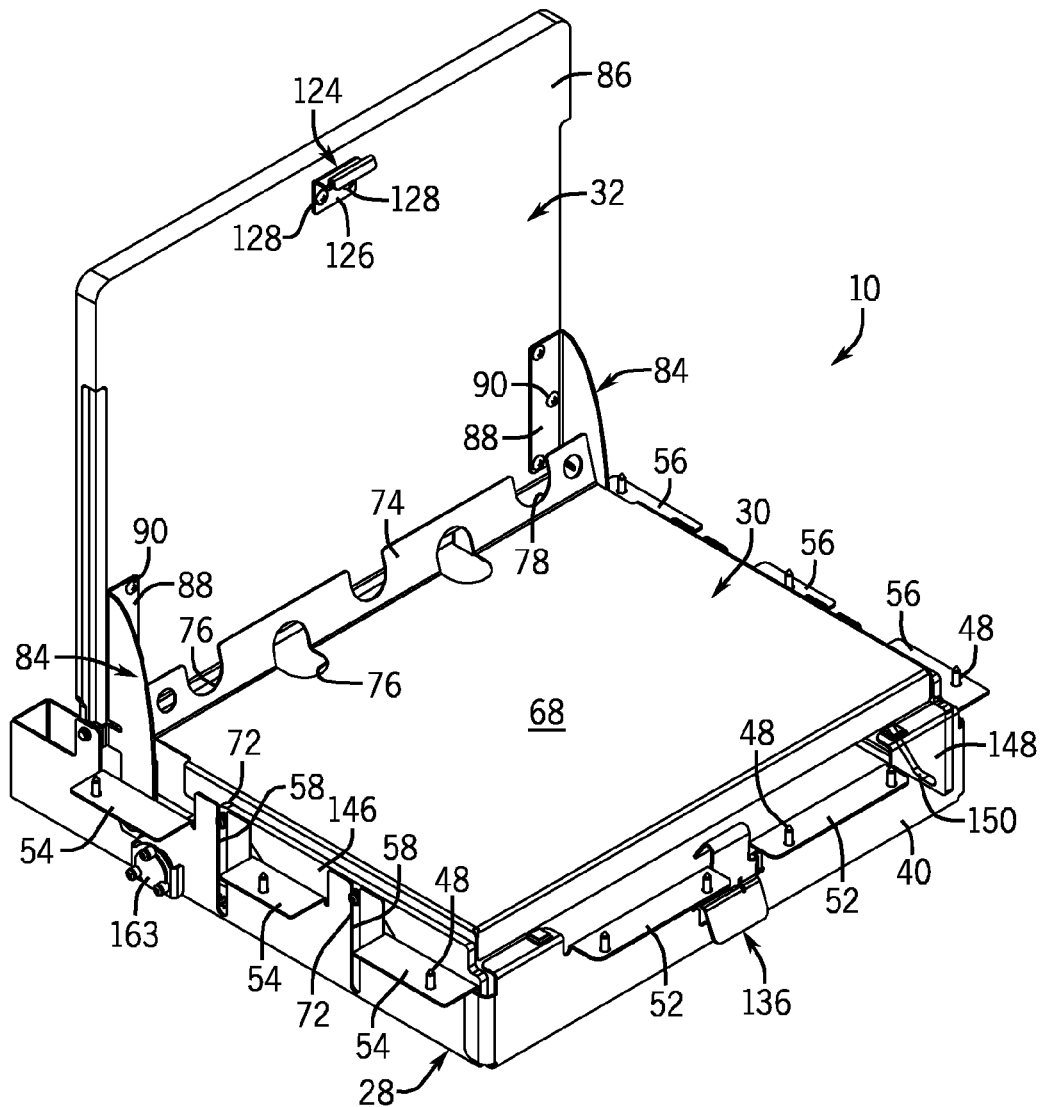
FIG. 3 is a perspective view of the storage assembly similar to FIG. 2, showing the storage assembly in a fully open configuration with a portion of the front wall broken away.

Referring to FIGS. 3 and 4, to assist in controlling movement of the cover 32 between the open position and the closed position, a pair of hinge brackets 84 are affixed to a lower surface 86 of the cover 32 at the lower end thereof. Each hinge bracket 84 includes an engagement portion 88 fixedly connected to the lower surface 86 of cover 32 by a set of fasteners 90 passed through aligned openings 92, 94 formed in the hinge brackets 84 and cover 32, respectively. Each hinge bracket 84 also includes a guide portion 96 extending perpendicularly from the engagement portion 88. The guide portion 96 has a flange 98 that is pivotally connected to the rod 80 adjacent the tab portions 62 on the enclosure side walls 42, 44 using retainer 100. A lower end of each guide portion 96 further includes a laterally extending guide pin 102 and a forwardly facing flange 104. Each flange 104 serves as a mounting bracket for a spring biased device 106 (FIGS. 6, 8 and 9) used in assisting the initial opening of the cover 32. As best seen in FIG. 4, each device 106 includes a shoulder bolt 108 which passes through a coil spring 110, a washer 112 and the hinge bracket 104 and has a lower end threaded into a nut 114, on a forward face of the flange 104. The spring 110 is variously compressed between a head on the shoulder bolt 108 and the flange 104 during opening of the cover 32 as will be described further below. As depicted in FIGS. 4, 6 and 7, spring cover plates 116 have base flanges 118 with holes 120 aligned with openings 66 that receive fasteners 122 to effect mounting of the cover plates 116 to the bottom wall 38 of the enclosure 28 at a rearward end thereof for partially surrounding and protecting the spring opening devices 106.

Referring to FIGS. 3, 4 and 6, the cover 32 includes a latch 124 secured to the lower surface 86 at an upper end thereof. Latch 124 includes a securing end 126 provided with bores 128 and attached to the cover 32 by fasteners 130. The latch 124 further includes a locking end 132 having a notch 134 that is engageable with a handle 136 pivotally secured to the front wall 40 of enclosure 28. The handle 136 includes an engaging end 138 that can be pivoted over the locking end 132 when the cover 32 is in the closed position, and a grasping end 140 disposed opposite the engaging end 138. Referring to FIG. 8, the grasping end 140 can be pushed towards the enclosure 28 (in the direction of arrow A) to pivot the engaging end 138 away (in the direction of arrow B) from the locking 132 of the latch 124 such that cover 32 can be moved from the closed position to the open position. The engaging end 138 can be biased towards the locking position (in the direction of arrow C, FIG. 6) by a spring 142 or other biasing member disposed on a shaft 144 to which the handle 136 is pivotally secured. Spring 142 is retained on shaft 144 by a retainer 145 (FIG. 4). The handle 136 can also include a conventional (e.g. key-operated) locking mechanism (not shown) that prevents pivoting of the handle 136 until the locking mechanism is disengaged.

The movement control arrangement 34 is interconnected between the enclosure 28, the platform 30, and the cover 32 for enabling the movement of the platform 30 between the retracted and the elevated positions as the cover 32 is pivoted between the closed and open positions, respectively.

The movement control arrangement includes a pair of spaced apart shuttle plates 146, 148 slidably confined for back and forth movement longitudinally within the enclosure 28, and mounted between inner surfaces of the enclosure side walls 42, 44 and the outer surface of the side portions of the downturned edges of platform 30 as illustrated in FIG. 7. As will be appreciated hereafter, shuttle plates 146, 148 are designed to move relative to the enclosure 28 and the platform 30 in response to movement of cover 32.

Referring to FIGS. 4 and 6-9, each shuttle plate 146, 148 has a pair of spaced apart angled guide slots 150, 152 extending generally upwardly and rearwardly, and having horizontally extending slot portions 154, 156 at their lower and upper ends, respectively. Each shuttle plate 146, 148 also has a vertical guide slot 158 located near the rear end thereof, and a horizontal gear rack 160 formed on a bottom end of a slot 161 disposed between the angled guide slots 150, 152 and the vertical guide slot 158.

The shuttle plates 146, 148 are positioned within the enclosure 28 such that the angled guide slots 150, 152 are aligned with the vertical guide slots 58 formed in the enclosure side walls 42, 44. The aligned guide slots 58, 150, 152 commonly receive the guide pins 72 on platform 30 with the guide pins 72 being retained by grip bushings 162 for travel in the aligned slots 58, 150, 152. At the same time, guide pins 102 on the bottom of hinge brackets 84 are received for travel in the vertical guide slots 158 formed at the rear of the shuttle plates 146, 148.

The movement control arrangement 34 also includes a rotary damper 163 as seen in FIGS. 4 and 6-9. In the preferred embodiment, the rotary damper 163 is mounted by fasteners 164 in a receiver 60 provided on the enclosure side wall 42. The damper 163 has a gear 166 rotatably engaged with a plurality of teeth 168 formed on the gear rack 160 of shuttle plate 146 to guide shuttle plates 146, 148 which are commonly engaged by the guide pins 102 on hinge brackets 84 of cover 32 back and forth along a predetermined path within enclosure 28 to control movement of cover 32. The damper gear 166 is preferably an oil-filled gear such that rotation of the gear 166 is opposed or damped in a manner that restricts the speed of movement of the gear 166 along rack 160. This, in turn, causes the cover 32 to pivot in a controlled manner in both directions and prevents both the platform 30 and cover 32 from being quickly moved to either the elevated or retracted, and opened or closed positions, respectively. Alternatively, the damper 163 may be mounted in receiver 60 formed in the opposite enclosure side wall 44, or a rotary damper 163 may be mounted in each receiver 60.

In FIG. 6, the cover 32 is pivoted to and held in the closed position relative to the enclosure 28 by means of the handle engaging end 138 of handle 136 which is normally spring biased into engagement with the locking end 132 and notch 134 of latch 124. In the closed position, an upper surface 170 of cover 32 is substantially coplanar with the upper surface 16 of desk 12 to give the appearance of a generally continuous work surface 14. An upper end of the lower surface 86 of the closed cover 32 rests upon a stop 72 fixed to an upper end of front wall 40. Spring opening devices 106 on the hinge brackets 84 are biased into direct contact against the lower surface 20 of desk 12. Platform 30 lies in the retracted position upon bottom wall 38 of enclosure 28 with its guide pins 72 engaged in the aligned guide slots 58 and 150, and 58 and 152 on the enclosure 28 and the shuttle plates 146, 148, respectively. Guide pins 102 on hinge brackets 84 are engaged in the slots 158 formed on the shuttle plates 146, 148. Shuttle plates 146, 148 are located at their rearward-most position relative to the enclosure 28 with damper gear 166 engaged on the shuttle plate gear rack 160 at a forward end thereof.

In FIG. 8, pushing and grasping member 140 of handle 136 in the direction of arrow A against the bias of spring 142 will cause the engaging end 138 to pivot in the direction of arrow B so that it will disengage from the notch 134 of latch 124. This unlocking action causes the cover 32 to pivot to a partially open position assisted by the release force of the expanding springs 110 in the opening devices 106 which also commences pivoting movement of the hinge brackets 84 in the direction of arrow D. Initial movement of the hinge brackets 84 forces shuttle plates 146, 148 slightly forward at the same time in the same or common direction of arrow E. The shuttle plates 146, 148 slidably move lengthwise of the enclosure 28 along a linear path defined by the gear rack 166, and slidably move relative to the platform guide pins 72 along horizontal portions 154 of the angled slots 150, 152 as platform 30 remains in the retracted position.

FIG. 9 illustrates that a further manual opening of cover 32 as controlled by damper 166 continues to slide the shuttle plates 146, 148 forwardly along the linear path defined by the gear rack 166 in the direction of arrow E. During this shuttle plate movement, the platform guide pins 72 will travel along a second path defined by the aligned guide slots 58 and 150, 156, and 58 and 152, 156. As a result, the platform 30 is progressively moved in the direction of arrow F to the elevated position as the cover 32 is moved in the direction of arrow G to a fully open position. A laptop computer (not shown) supported upon the platform 30 would now be exposed and ready for use with desired.

Pivoting the cover 32 to the locked, closed position will cause the shuttle plates 146, 148 to slide rearwardly of the enclosure 28 at the same time and in the same or common direction and progressively lower the platform 30 back to the retracted position. Movement of damper gear 166 along gear rack 160 provides a controlled, smooth closing of cover 32 and synchronous controlled lowering of platform 30. As the cover 32 moves between the open and closed positions, the pins 102 on hinge brackets 84 are guided up and down in vertical slots 158 in the shuttle plates 146, 148, as seen in FIGS. 6-9.

Various alternatives are contemplated as being within the scope of the following claims particularly pointing out and distinctly claiming the subject matter regarded as the invention.

We claim:

1. A storage assembly adapted to be secured to a work surface, the storage assembly comprising:
   an enclosure defining an interior, wherein the enclosure is adapted to be secured below an opening in the work surface;
   a platform disposed within the enclosure;
   a cover connected to the enclosure by a set of hinge brackets, and configured to enclose the interior of the enclosure, the cover being movable between a closed position and an open position, wherein the cover in the closed position forms a top wall for the enclosure, and wherein the cover in the open position exposes the platform;
   a movement control arrangement connected between the enclosure, the platform and the cover, wherein the movement control arrangement and the enclosure have cooperating guide slot structure for receiving and guiding the platform, and enabling raising and lowering of the platform within the enclosure in response to movement of the cover between the open and closed positions,
   wherein the movement control arrangement includes a set of shuttle plates mounted for longitudinal movement simultaneously in a same direction relative to the enclosure during movement of the cover between the open and closed positions;
   wherein the shuttle plates include vertical guide slots which receive engagement pins that are provided on the hinge brackets and are guided up and down in the vertical guide slots as the cover moves between the open and closed positions; and
   wherein the hinge brackets are provided with opening spring mechanisms engaged with the work surface when the cover is in the closed position, and disengaged from the work surface when the cover is in the open position.

2. The storage assembly of claim 1, wherein the movement control arrangement is slidably confined within the enclosure for movement between the enclosure and the platform.

3. The storage assembly of claim 1, wherein the shuttle plates include substantially angled guide slots aligned with vertical guide slots formed on the enclosure.

4. The storage assembly of claim 3, wherein the platform has guide pins received for movement in the aligned angled guide slots and vertical guide slots.

5. The storage assembly of claim 1, further comprising a locking mechanism disposed on the enclosure and releasably engaged with the cover for releasably retaining the cover in the closed position.

6. The storage assembly of claim 1, wherein the shuttle plates further include gear racks disposed between the vertical guide slots and the angled guide slots formed on the shuttle plates.

7. The storage assembly of claim 6, wherein the enclosure is provided with at least one damper gear engageable with one of the gear racks on the shuttle plates to control movement of the platform and the cover.

8. A work surface comprising:
   a work support member having an upper surface, a lower surface and an opening extending from the upper surface to the lower surface;
   a storage assembly secured around the opening, the storage assembly including an enclosure having a bottom wall and upwardly extending side and front walls that cooperate to define an interior and are secured to the work support member, a platform disposed within the enclosure and a cover pivotally secured to the enclosure by a pair of hinge brackets, and movable between a closed position and an open position, wherein the cover is substantially coplanar with the upper surface of the work support member in the closed position; and
   a movable shuttle arrangement connected between the enclosure, the platform and the cover, wherein opening of the cover moves the shuttle arrangement within the enclosure in one direction along a first path formed in the shuttle arrangement, and causes the platform to be raised in the enclosure along a second path defined by aligned guide slots in the shuttle arrangement and the enclosure, and closing of the cover moves the shuttle arrangement within the enclosure along the first path in another direction opposite to the one direction, and causes the platform to be lowered within the enclosure along the second path,
   wherein the shuttle arrangement includes a pair of shuttle plates mounted for longitudinal movement simultaneously in a same direction relative to both the enclosure and platform during movement of the cover between the open and closed positions,
   wherein the shuttle plates each include a pair of upwardly and rearwardly extending guide slots, a vertical guide slot and a horizontal slot formed with a gear rack,
   wherein the vertical guide slots receive engagement pins that are provided on the hinge brackets, and are guided up and down in the vertical guide slots as the cover moves between the open and closed positions, and
   wherein the hinge brackets are provided with opening spring mechanisms engaged with the work surface when the cover is in the closed position, and disengaged from the work surface when the cover is in the open position.

9. The work surface of claim 8, wherein at least one shuttle plate is slidably connected relative to the enclosure by means of a damper gear engaged in the gear rack.

10. The work surface of claim 8, wherein the side walls of the enclosure are formed with vertical guide slots that are aligned with the upwardly and rearwardly extending guide slots of the shuttle plates.

11. The work surface of claim 10, wherein the platform has guide pins that are engaged for travel in the aligned guide slots on the enclosure and shuttle plates.

12. The work surface of claim 8, wherein the shuttle plates are mounted for sliding movement in planes parallel to planes of the side walls of the enclosure.

13. A method for selectively storing and exposing an object relative to a work surface, the method comprising the steps of:
   (a) providing a work support surface having an opening, a storage assembly including an enclosure defining an interior and secured around the opening, a platform disposed within the interior of the enclosure, a cover pivotally secured to the enclosure by a pair of hinge brackets, the cover being movable between an open position and a closed position, and a movement control arrangement connected between the enclosure, the platform and the cover, wherein the movement control arrangement and the enclosure are formed with cooperating guide slot structure for receiving and guiding the platform and wherein the object is disposed on the platform;

(b) selectively pivoting the cover away from the enclosure and towards the open position to actuate the movement control arrangement such that the platform is raised along a path defined by the cooperating guide slot structure to expose the object on the platform; and (c) selectively pivoting the cover towards the enclosure and the closed position to actuate the movement control arrangement such that the platform is lowered along the path defined by the cooperating slot structure to store the object on the platform within the enclosure, wherein the movement control arrangement includes a pair of shuttle plates having vertical guide slots which receive engagement pins that are provided on the hinge brackets, and are guided up and down in the vertical guide slots as the cover moves between the open and closed positions, and wherein the hinge brackets are provided with opening spring mechanisms engaged with the work surface when the cover is in the closed position, and disengaged from the work surface when the cover is in the open position.

* * * * *